United States Patent [19]

Smith, Jr.

[11] 4,131,589

[45] Dec. 26, 1978

[54] LOW TEMPERATURE TRANSMISSION ROOM TEMPERATURE VULCANIZABLE SILICONE COMPOSITIONS

[75] Inventor: Alfred H. Smith, Jr., Jonesville, N.Y.

[73] Assignee: General Electric Company, Waterford, N.Y.

[21] Appl. No.: 750,062

[22] Filed: Dec. 13, 1976

[51] Int. Cl.$^2$ ............................................. C08L 83/04
[52] U.S. Cl. .................................................. 260/37 SB
[58] Field of Search ............. 260/37 SB; 106/DIG. 3

[56] References Cited

U.S. PATENT DOCUMENTS

| | | | |
|---|---|---|---|
| 3,708,467 | 1/1973 | Smith et al. | 260/37 SB |
| 3,969,310 | 7/1976 | Itoh et al. | 260/37 SB |

*Primary Examiner*—Lewis T. Jacobs

*Attorney, Agent, or Firm*—E. Philip Koltos; John L. Young; Frank L. Neuhauser

[57] ABSTRACT

The present invention relates to a one-component room temperature vulcanizable silicone composition which has a low moisture vapor transmission rate which is accomplished by mixing with a silanol-terminated diorganopolysiloxane Polymer from 75 to 150 parts of mica with optionally up to 30% by weight of talc, per 100 parts of the silanol-terminated diorganopolysiloxane polymer. In this composition there can be utilized any of the known cross-linking agents for one-component room temperature vulcanizable silicone rubber compositions such as, acyloxy functional silanes, alkoxy functional silanes, ketoximino functional silanes, amide functional silanes, tert-alkoxy functional silanes and amine functional silanes.

16 Claims, No Drawings

LOW TEMPERATURE TRANSMISSION ROOM TEMPERATURE VULCANIZABLE SILICONE COMPOSITIONS

BACKGROUND OF THE INVENTION

The present invention relates to silicone rubber compositions having low vapor moisture transmission and more particularly the present invention relates to a one-component room temperature vulcanizable silicone rubber composition having a low vapor moisture transmission rate.

Silicone compositions and specifically one-component room temperature vulcanizable silicone rubber compositions are well known. These compositions normally comprise a silanol-terminated linear diorganopolysiloxane polymer, a filler, a functional silane cross-linking agent and a catalyst. Of course, other optional ingredients may be added to this basic composition. The resulting composition which is prepared in an anhydrous state and stored in an anhydrous state with all the ingredients mixed therein, is simply applied to a surface for a particular application such as, sealing applications, and in the presence of atmospheric moisture the silicone composition will then cure to a silicone elastomer. Such compositions are utilized for a variety of purposes such as, for instance formed-in-place gaskets but are most widely used in sealant applications and specifically in the sealing of window panes, as well as other ceramic surfaces. Such one-component room temperature vulcanizable silicone rubber compositions are quite adhesive to most substrates and cure to a silicone elastomer, which has outstanding resistance to the elements, as well as to the ozone in the air and as well as to ultra-violet rays which usually deteriorate other more conventional sealants. In addition, while such one-component room temperature vulcanizable silicone rubber compositions are adhesive to most substrates, they also have desirable tensile strength and modulus in addition to their other properties such that they will maintain their adhesion as a sealant with respect to window panes from very low temperatures such as −60° F to very excessively high temperatures such as, 300° F or above, that is, such silicone sealants maintain their protective properties even at excessively low temperatures or excessively high temperatures.

Recently, there has been an innovation in the construction industry to produce, instead of thermopane windows, insulated glass windows in the construction of buildings. Thermopane windows are those in which two sheets of glass are adhered to one another around the edges with a layer of air in between the glasses from which there is removed all moisture and the resulting dual window pane or thermopane has outstanding insulation resistance to the passage of thermal energy. However, such thermopane windows are excessively expensive to manufacture, as can be understood, since all the edges of the two windows have to be sealed to each other to prevent the passage of any moisture into the air pocket that is located between the two window panes.

Accordingly, a new innovation has been brought into the manufacture of such thermally insulated window panes and that is, the insulated glass design. In such insulated glass design two window panes are taken and they are sealed at their edges by a sealant which may be, for instance, a polysulfide sealant. The window panes are then installed in a building and particularly a high rise building and are further sealed to the window frame by said polysulfide sealants. Unfortunately, it has been found that such insulated glass construction with such prior art sealants allow more moisture than is desired to be transmitted through the sealant into the air space between the window panes. Accordingly, as a result of this, too much moisture migrates through the sealant into the air space between the two window panes and the window tends to fog up as a result of the moisture particles in the air space between the two window panes condensing out against the window pane. This has been found to be the case, even when conventional one-component or two-component room temperature vulcanizable silicone rubber compositions were utilized as sealants.

One solution to this problem was to utilize butyl tape which has a low moisture vapor transmission rate as an initial sealant in the edges of such insulated glass panes in which tapes there are located micro sieves or silica gel and thereover apply the conventional sealant or conventional silicone sealant to seal or prepare the insulated glass pane from the two or three individual glass window panes. Unfortunately, such conventional silicone sealants or other conventional sealants even with the butyl tape with the dessicant in the space over which the sealant was applied still resulted in a larger than desirable moisture vapor transmission rate into the air space between the window panes. As a result, in some cases, these types of constructed insulated glass panes would tend to fog up when the unit was tested and cycled at temperatures going from −60° F to 150° F. In addition, the use of silica gel along with the butyl tape and the conventional sealant would unduly increase the cost of the construction of the insulated glass. Accordingly, it was highly desirable to produce a silicone sealant which would have a moisture vapor transmission rate considerably below that of conventional silicone sealants which moisture vapor transmission rate for conventional silicone sealants is in the range of 40 to 50 grams per square meter in 24 hours, through a layer of silicone material varying anywhere from 60 to 75 mills thick. Low moisture vapor transmission rate silicone sealants were desired so that they could be utilized over butyl tape with the micro sieves or silica gel to produce insulated glass panes which would resist the passage of moisture into the air pocket between the glass panes and allow the glass panes to function at excessively low temperatures without fogging up, Especially, such glass panes would be able to pass the cycling test mentioned previously wherein such insulated glass panes are cycled from −60° F to 150° F and wherein during such cycling periods the window pane would not fog up.

In a most advantageous preferred embodiment in the construction of such insulated glass panes, such low moisture vapor transmission rate silicone sealants could be applied over butyl tape with dessicants and then the insulated glass pane would then be again sealed with such low moisture vapor transmission rate silicone sealants against the window frame to allow for construction of an insulated glass pane which was considerably below the cost of a thermopane and which at the same time would function as well as the thermopane without excessive transmission of vapor from the atmosphere into the air space between the glass panes of the insulated glass unit and as such the insulated glass unit would not fog up at excessively low temperatures and visibility through it would not be impaired as was the case with some prior art insulated glass panes. Two-component room temperature vulcanizable silicone rubber compositions which have these properties are those described in the copending application of Alfred H. Smith, Docket 60SI-89 — entitled Low Vapor Transmission Rate Silicone Compositions.

Further, the present invention results in a silicone sealant with excellent weatherability and low moisture vapor transmission rate as compared to the other sealants which might have low moisture vapor transmission rate but not have good weatherability and they lose their strength after a few years.

However, two-component compositions while having the advantages of a faster cure rate than one-component compositions and being capable of having a deep section cure have several disadvantages with respect to one-component. However, in one-component room temperature vulcanizable silicone rubber compositions since all of the necessary ingredients are already mixed there is no necessity for obtaining a mixing or dispensing apparatus for applying the composition to a substrate. Accordingly, such one-component room temperature vulcanizable silicone compositions can be dispensed on site wherever the insulated glass is used or can be utilized to seal into place a third window pane on top of the two window panes in the insulated glass construction. However, one component systems have the disadvantage that in some cases they are slower to cure than the corresponding two-component system set forth in the copending Smith case. On the other hand, as pointed out previously, since one-component is already mixed in the caulking tube from which the sealant may be applied, there is no need for mixing apparatus. The composition is void-free and it does not have any bubbles which might be forced into the two-component system while it is being mixed from the mixing apparatus. Accordingly, it is much easier to dispense and apply than is the two-component system. Accordingly, it is highly advantageous to have a one-component room temperature vulcanizable silicone rubber composition with a low moisture vapor transmission rate such that it can be applied on site or any time to produce or repair insulated glass panes or if any other application where a low moisture vapor transmission rate sealant is desired.

Accordingly, it is one object of the present invention to provide for a one-component room temperature vulcanizable silicone rubber composition which has a low moisture vapor transmission rate.

It is another object of the present invention to provide for an already mixed room temperature vulcanizable silicone rubber composition which has a low moisture vapor transmission rate which can be applied and adheres to many substrates and can cure upon being exposed to atmospheric moisture. It is an additional object of the present invention to provide for a one-component room temperature vulcanizable silicone rubber composition which has a low moisture vapor transmission rate and which can be applied to seal and form insulated glass panes.

It is yet an additional object of the present invention to provide for a process for producing a one-component room temperature vulcanizable silicone rubber composition which has a low moisture vapor transmission rate.

These and other objects of the present invention are accomplished by means of the disclosure set forth hereinbelow.

SUMMARY OF THE INVENTION

In accordance with the above objects, there is provided by the present invention a low vapor transmission room temperature vulcanizable silicone rubber composition comprising (a) 100 parts by weight of a silanol-terminated diorganopolysiloxane having a viscosity varying from 100 to 500,000 centipoise at 25° C, where the organo groups are selected from the class consisting of monovalent hydrocarbon radicals and halogenated monovalent hydrocarbon radicals; (b) from 75 to 150 parts by weight of a vapor barrier filler selected from the class consisting of mica, wherein up to 30% by weight of said mica may be substituted by talc; (c) from 1 to 15 parts by weight of a silane or siloxane having functionality selected from the class consisting of alkoxy functionality, acyloxy functionality, amine functionality, amide functionality, ketoximino functionality, and a tert-alkoxy functional silane or siloxane; and (d) from 0.01 to 5 parts by weight of a catalyst. Further, there is also provided by the present invention a process for producing a silicone elastomer from the above composition where the above composition is simply applied to a substrate and allowed to cure in the presence of atmospheric moisture. Preferably, all of the vapor barrier filler is a 100% mica filler, but as stated previously up to 30% may be substituted by talc. The mica fille whether wet or dry ground is the one that imparts to the instant silicone composition the desired properties of being resistant to moisture vapor transmission through the silicone elastomer in its cured state or in some respects, even in its uncured state. The vapor barrier filler whether it be mica or talc can have a particle size varying anywhere from 50 to 4,000 mesh. In addition to the above mica and possibly and optionally talc filler, there may be utilized in the compositions of the instant case from 5 to 30 parts by weight of a filler which may be a reinforcing filler such as, fumed silica, precipitated silica or may be an extending filler such as, zinc oxide, diatomaceous earth and etc. In the present composition, the only necessity for using the foregoing additional fillers is to give the sealants some sag control so that when it is applied to the substrate which is in a vertical position, the sealant will stay in place for a sufficient period of time to cure to a silicone elastomer without flowing away from the point of application.

Any of the other well known additives for one-component room temperature vulcanizable silicone rubber compositions can be utilized in the present composition if they do not interact with the mica filler. Specifically, almost all known ingredients that can be utilized for one-component room temperature vulcanizable silicone rubber compositions can be utilized in the instant composition. In the case of additional filler additives, they have to be adjusted so as to not overload the composition with filler in view of the large amounts of mica and optionally talc that may be present in the instant composition.

The cross-linking agents and the catalyst are well known ingredients that may be present in the instant one-component room temperature vulcanizable silicone rubber compositions and are any well known cross-linking agents for such systems along with the catalyst that are most suitable for such compositions. For instance in the case of the utilization of an alkoxy functional silane as a cross-linking agent then it is preferred that a titanium chelate catalyst be utilized by itself or in combination with a metal salt of a carboxylic acid as is well known in the art.

Basically, the instant invention lies in the utilization of a mica filler within the size limitations and conditions disclosed above, and optionally the talc in any one-component room temperature vulcanizable silicone rubber composition for the purpose of rendering the composition resistant to the passage of moisture vapor. It should be noted that the mica filler may be treated or untreated in the instant case and also the optional talc. The additional filler such as, fumed silica or precipitated silica, if such are used, and preferably treated since such treatment prevents the viscosity of the composition from getting undesirably too high. The advantage of the treated fumed silica or precipitated silica is that it can be utilized in the composition without unduly increasing its viscosity and at the same time give desirable sag control as well as impart to the compositions good tensile strength in the final cured composition. Normally, such fumed silica or precipitated silica are treated with cyclicisiloxanes. In any case, for particular application, untreated fumed silica or precipitated silica can be utilized in smaller amounts than would be the case with the treated filler to impart to the composition the desired sag control without necessarily increasing the tensile strength of the cured elastomer. The invention will more distinctly be set forth hereinbelow.

DESCRIPTION OF THE PREFERRED EMBODIMENT

The base silanol-terminated diorganopolysiloxane polymer having a viscosity varying from 100 to 500,000 centipoise at 25° C is a well known ingredient for one-component room temperature vulcanizable silicone rubber compositions. The organo groups may be selected from monovalent hydrocarbon radicals and halogenated monovalent hydrocarbon radicals such as, for instance, alkyl radicals, methyl, ethyl, etc. readicals having 1 to 8 carbon atoms; alkenyl radicals having 2 to 8 carbon atoms such as, vinyl, allyl; mononuclear aryl radicals such as, phenyl, methylphenyl, ethylphenyl and etc.; cycloalkyl radicals such as, cyclohexyl, cycloheptyl and etc., and fluoroalkyl radicals such as 3,3,3, trifluoropropyl. More preferably, such organic groups are preferably selected from alkyl radicals of 1 to 8 carbon atoms, phenyl radicals, vinyl radicals and fluoroalkyl radicals of 1 to 8 carbon atoms. Generally such linear diorganopolysiloxane polymers may have a small amount of triorganoisiloxy termination in the polymer of up to 10% by weight of the polymer and may have some trifunctional siloxy units also in the polymer with the total amount of monofunctionality and trifunctionality not exceeding 10% by weight, Most preferably, the silanol-terminated linear diorganopolysiloxane polymer has the formula,

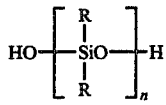

In the above formula, R is selected from the class consisting of alkyl radicals of 1 to 8 carbon atoms, phenyl, radicals, vinyl radicals and fluoroalkyl radicals where the R radicals may be the same or different and n varies from 150 to 1500. In accordance with the above disclosure, the polymer preferably has the formula shown above but, as stated previously, a silanol-terminated diorganopolysiloxane polymer need not be strictly within the formula shown above and may have a certain amount of monofunctional siloxy units and a certain amount of trifunctional siloxy units which at most can comprise up to 10% by weight of the polymer. It can also be appreciated that such a polymer need not be a single polymer specie but may be a blend of various linear diorganopolysiloxane polymers which are silanol-terminated and such that the blend of the final polymers has a viscosity varying from 100 to 500,000 centipoise at 25° C. Such silanol-terminated diorganopolysiloxane polymers are well known in the art as the necessary ingredients or base ingredients for one-component room temperature vulcanizable silicone rubber compositions and two-component room temperature vulcanizable silicone rubber compositions. Such silanol-terminated diorganopolysiloxane polymers may be prepared by two general procedures. In one procedure, cyclictetrasiloxanes are equilibrated in the presence of a small amount of chain-stoppers such as, hexamethyldisiloxane and in the presence of 50 to 500 parts per million of alkali metal hydroxide and by such equilibration there are produced high viscosity polymers in a viscosity varying from 500,000 to 200,000,000 centipoise. The resulting triorganosiloxy terminated diorganopolysiloxane polymers are then taken and steam is passed through them to disrupt the polymer chain and as a result there is formed silanol-terminated linear diorganopolysiloxane polymers in the viscosity range disclosed above for use in the instant invention. In an alternate procedure and preferably for low viscosity and low molecular weight silanol-terminated diorganopolysiloxane polymers, a hydrolyzate of diorganodichlorosilanes is taken and mixed with the proper quantities of cyclictetrasiloxanes and the resulting mixture is equilibrated in the presence of a mile acid such as, sulfuric acid treated clay (such as the clays called Filtrol sold by Filtrol Corp. of Log Angeles, California) or equilibrated with a mild acid such as, toluene sulfonic acid to produce the desired low molecular weight and low viscosity silanol-terminated diorganopolysiloxane polymers. As can be appreciated, through either of these procedures and specifically by the second procedure disclosed above for the preparation of silanol-terminated diorganopolysiloxane polymers, a small amount of monofunctional and trifunctional siloxy units may be present in the hydrolyzate of the diorganodichlorosilanes and as a result the final polymer that is obtained after equilibration a polymer having up to 10% of monofunctional siloxy units and tetrafunctional siloxy units. It should be noted that in both procedures set forth above, after the equilibration has terminated or has reached its maximum point, which is roughly 85%, that is after conversion of 85% of the cyclictetrasiloxanes to the polymer, the equilibration is stopped and the residual cyclice are stripped off and the catalyst is neutralized with well known neutralizing agents. The polymer is then ready to be utilized in a subsequent step with steam in accordance with the first method for producing the silanol-terminated diorganopolysiloxane polymer or is simply utilized as such in the second step for producing the low molecular weight silanol-terminated diorganopolysiloxane polymers. It is important that per 100 parts by weight of the silanol-terminated diorganopolysiloxane polymer there be incoporated into it from 75 to 150 parts by weight of a vapor barrier filler selected from the class consisting of mica, wherein up to 30% by weight of the mica may be substituted by talc. More preferably, 100 to 150 parts by weight of the vapor barrier filler is utilized. Although ranges of mica can be utilized outside of the above ranges, when there is utilized a vapor barrier filler loading of less than 75 parts by weight of the silanol-terminated diorganopolysiloxane polymer then the resulting cured silicone elastomer does not have a desirably high enough resistance to vapor moisture transmission. As can be appreciated, more than 150 parts by weight of the mica may be utilized, however, the viscosity of the composition unduly increases to undesirable levels for many application techniques and especially in view of the fact that such one-component room temperature vulcanizable silicone rubber compositions have to be dispensed from caulking tube and accordingly a low viscosity of the final composition is desired. The preferred ranges, as stated previously for the mica, is from 100 to 150 parts by weight since it has been found that through the above preferred range there is obtained the maximum benefits for resistance to moisture vapor transmission in the one-component room temperature vulcanizable silicone rubber compositions of the instant case.

It should be noted that either wet ground or dry ground mica may be utilized in the instant invention and that such mica preferably has a US mesh size varying anywhere from 50 to 4000 mesh. In accordance with the above, the particle size of the mica in a composition is not that critical, the critical aspect being, in the instant case, to have sufficient mica in the one-component room temperature vulcanizable silicone rubber compositions of the instant case such that the proper resistance to moisture vapor transmission is realized In addition, the mica may be treated or untreated. The only difference with the utilization of treated mica and treated talc is that more of the mica or talc can be added to the compositions of the instant case without increasing the viscosity of the composition as much as is the case with the untreated mica or talc.

The ingredients that may be utilized to treat the mica or talc are preferably selected from cyclicsiloxanes or organic fatty acids such as, stearic acid, which impart to the mica and talc a certain amount of hydrophobicity and results in that when the mica and talc is incorporated into the compositions of the instant case that the compositions do not unduly increase above the desirable viscosity for the composition. It should also be noted that preferably 100% of the vapor barrier filler is selected from wet ground mica or from dry ground mica. To save in costs, in certain situations, up to 30% by weight of the mica may be substituted by talc. With this vapor barrier filler there, advantageously may be utilized in the instant composition a concentration of 5 to 30 parts or more preferably at a concentration of 5 to 20 parts by weight of a reinforcing or an extending filler for the purpose of rendering the resulting uncured composition so that it has a certain amount of sag control. This addition of the traditional reinforcing and extending fillers to the instant composition is not necessary. It is only desirably utilized in the instant composition so that the composition does not sag as much as would be the case when such fillers are not inserted into the composition. It should be noted that the foregoing traditional reinforcing and extending fillers for silicone rubber compositions do not impart any resistance to moisture vapor transmission of the composition. As will be shown later on in the examples of the instant case, in silicone compositions in which there is utilized the traditional reinforcing and extending fillers, such silicone compositions have very little, if any, resistance to moisture vapor transmission. The foregoing above weights given for the weight of reinforcing or extending fillers may be utilized in the instant composition are based, per 100 parts of the silanol-terminated diorganopolysiloxane polymer. The reinforcing fillers are, of course, well known fumed silica and precipitated silica. The extending fillers are also well known for silicone rubber compositions and are preferably selected from titanium dioxide, iron oxide, aluminum oxide, as well as the inorganic filler materials known as inert fillers which can include, among others, diatomaceous earth, calcium carbonate and quartz, as well as diatomaceous silica, aluminum silicate, zinc oxide, zirconium silicate, barium sulfate, zinc sulfate, and finely divided silica having surface bonded alkoxy groups. It should be noted that such fillers may be treated or untreated and preferably are treated so that they will not unduly increase the viscosity of the uncured compositions of the instant case and also such treated fillers result in better sag control. The treating agents for such fillers and specifically for the reinforcing fillers, as is well known, are liquid siloxanes, silazanes and cyclicsilazanes in combination with hydroxyl amines. Another basic ingredient in the instant one-component room temperature vulcanizable silicone composition comprises from 1 to 15 parts by weight of the 100 parts of the silanol-terminated diorganopolysiloxane of a silane or siloxane having functionality selected from the class consisting of alkoxy functionality, acyloxy functionality, amine functionality, amide functionality, tert-alkoxy functional silanes and ketoximino functionality. All the above cross-linking agents with the above functionalities are well known in the art. It is the intent of the instant invention to claim and to cover within its scope all known one-component room temperature vulcanizable silicone rubber compositions which have mica inserted into them within the foregoing ranges disclosed above where the cross-linking agent, whether it be a silane or siloxane, has any functionality (the above functionalities being given as being exemplary) and also with whatever type of catalyst is suitable for such silane functionality cross-linking agent.

Accordingly, in the description the preferred cross-linking agents, as stated above, amy be a silane which has the formula,

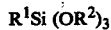

$$R^1Si(OR^2)_3$$

where $R^1$ is selected from the class consisting of alkyl radicals of 1 to 8 carbon atoms, phenyl radicals, alkenyl radicals of 2 to 8 carbon atoms and fluoroalkyl radicals of 3 to 8 carbon atoms and where $R^2$ is selected from the class consisting of alkyl radicals of 1 to 8 carbon atoms. Such alkoxy functional silanes with the base silanol-terminated diorganopolysiloxane for the purpose of producing a one-component room temperature vulcanizable silicone rubber composition are well known in the art as, for instance, as exemplified by Beers, U.S. Pat. No. 3,708,467, which is incorporated into the present case by reference. The method of preparation of such alkoxy functional silane cross-linking agents is also well known in the art as exemplified by the foregoing Beers patent. It should be noted that with such compositions it is preferable that the catalyst be a titanium chelate catalyst as disclosed in the foregoing Beers patent. It should be noted, however, that the catalyst in such compositions and specifically the titanium chelate catalyst in such compositions preferably comprises from 0.01 to 5 parts by weight based on 100 parts of the base silanol-terminated diorganopolysiloxane polymer. Optionally, the metal salt of a carboxylic acid where the metal ranges from lead to manganese in the periodic table may also be utilized with such alkoxy functional silanes and cross-linking agents to prepare a one-component room temperature vulcanizable silicone rubber composition, although such metal salts of monocarboxylic and dicarboxylic acids are not as effective in curing the composition as is the titanium chelate catalyst disclosed in the foregoing Beers patent. It should also be noted that with respect to such metal salts of carboxylic acids that not all metal salts of the foregoing lead to manganese metal salts is effective as a catalyst for one-component room temperature vulcanizable silicone rubber compositions, but most metal salts are so effective. In place of the alkoxy functional silane cross-linking agent there may be utilized in the instant composition, acyloxy functional silanes having the formula,

wherein in the foregoing formula $R^3$ is selected from the class consisting of alkyl radicals of 1 to 8 carbon atoms, phenyl radicals, alkenyl radicals of 2 to 8 carbon atoms and fluoroalkyl radicals of 3 to 8 carbon atoms and wherein $R^4$ is selected from alkyl radicals of 1 to 8 carbon atoms. The acyloxy functional silane cross-linking agents for one-component room temperature vulcanizable silicone rubber compositions are also well known. For instance, see the following patents of Harvey P. Shaw — U.S. Pat. Nos. 3,701,753 and 3,872,054.

The preparation and utilization of such acyloxy functional silanes in one-component room temperature vulcanizable silicone rubber compositions is also well known in the art as exemplified by the foregoing Shaw patents which are hereby incorporated into the present case by reference. Another silane that may be utilized as a cross-linking agent in the one-component composition of the instant case is, for instance, an amide functional silane having the formula,

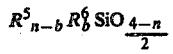

wherein $R^5$ is selected from the class consisting of hydrogen, alkyl radicals of 1 to 8 carbon atoms and phenyl, n is at least but it does not exceed 4, b has a positive value equal to at least 3, and $R^6$ is a Si—N bonded carboxylic acid amide radical having alkyl and aryl substituents of 1 to 8 carbon atoms. Examples of such amide functional silanes and siloxanes as cross-linking agents in the instant composition is that, for instance, to be found in U.S. Pat. No. 3,417,047, whose disclosure is hereby incorporated into the present case by reference. It should be noted again that the preparation, manufacture, and use of such amide functional silanes to produce one-component room temperature vulcanizable silicone rubber compositions is well known in the art is as exemplified by the foregoing '047 patent.

Another cross-linking agent that may be utilized to prepare a one-component room temperature vulcanizable silicone rubber composition within the scope of the present case, which composition has enhanced resistance to moisture vapor transmission, is a ketoximino functional silane which has the formula.

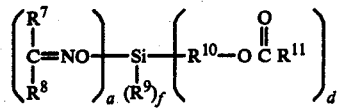

wherein $R^{11}$ is an alkyl radical of 1 to 8 carbon atoms, $R^7$ and $R^8$ may be the same or different and are alkyl radicals of 1 to 8 carbon atoms, $R^{10}$ is an alkylene radical of 2 to 8 carbon atoms, $R^7$ is an alkyl radical of 1 to 8 carbon atoms a is a whole number varying from 1 to 3, d is a whole number varying from 1 to 3, f is a whole number varying from 0 to 2 and the sum of a, d and f is 4. Utilization of such ketoximino cross-linking agents and their preparation to produce one-component room temperature vulcanizable silicone rubber compositions is well known in the art as exemplified by the Beers et al U.S. Pat. No. 3,962,160, which is hereby incorporated into the present case by reference. Accordingly, it is not necessary to go into the description in preparation of such ketoximino functional silanes for the preparation of one-component room temperature vulcanizable silicone rubber compositions since they are described in the foregoing Beers et. al. '160 patent which is incorporated into the present case by reference.

There can also be utilized a amine functional silane as a cross-linking agent in the instant composition. Such amine functional silane having the formula,

where $R^{18}$ is selected from the class consisting of alkyl radicals, phenyl radicals and fluoroalkyl radicals of 1 to 8 carbon atoms and $R^{19}$ and $R^{20}$ are selected from the class consisting of hydrogen, alkyl radicals of 1 to 8 carbon atoms and phenyl radicals, t is a whole number equal to 1 or 2, and z is 4. In addition, such silane cross-linking agents are well known in the art, that it their manufacture and preparation and also their utilization in one-component room temperature vulcanizable silicon rubber compositions as cross-linking agents.

Generally, as stated previously, to per 100 parts of the base silanol-terminated diorganopolysiloxane polymer there may be utlized from 1 to 15 parts by weight of the silane or siloxane cross-linking agent and more preferably from 1 to 10 parts by weight of the silane or siloxane cross-linking agent. With such silanes as cross-linking agents it has been desirable to have from 0.01 to 5 parts by weight of a catalyst of the foregoing catalyst disclosed above, with the exception of the alkoxy functional silane in which it is highly desirable to utilize a titanium chelate catalyst, otherwise the composition will cure too slowly in the presence of atmospheric moisture, it suffices to use as a catalyst the metal salt of a monocarboxylic or dicarboxylic acid where the metal is selected from lead to manganese in the periodic table.

It should also be pointed out that not all such metal salts will work but most of such metal salts of such monocarboxylic or dicarboxylic acid can be utilized in the instant case such as, for instance, the tin salts and specifically dibutyl tin dilaurate and dibutyl tin oxide.

Accordingly, a composition with the foregoing ingredients set forth above, that is, the base silanol-terminated diorganopolysiloxane polymer, a vapor barrier filler, optionally a reinforcing or extending filler, a cross-linking agent and the catalyst simply mixed in an anhydrous state, and packaged as such when the mixed ingredients come into contact with atmospheric moisture they will cure to a silicone elastomer. It should be noted that when the components are mixed together to form a one-component room temperature vulcanizable silicone rubber composition, the mixing operation does not have to be completely anhydrous although there is a drying cycle after such mixing which takes place to remove most moisture from the composition. If such composition is then stored in the absence of mositure (say in a well sealed caulking tube) the composition has a shelf life of 6 months or more and can at any time be taken and dispensed for a particular application and when the composition comes into contact with atmospheric moisture it will then cross-link and produce a silicon elastomer with the foregoing exceptional resistance to moisture vapor transmission.

To this basic composition there may be added other ingredients. For instance, there may be added from 0.01 to 5 parts by weight based on 100 parts of the base polymer of a silane of the formula,

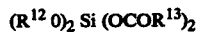

where $R^{12}$ and $R^{13}$ are selected from alkyl and aryl radicals of 1 to 8 carbon atoms and may be the same or different. It should be noted that the foregoing alkoxy, acyloxy functional silane is an exceptional adhesion promoter for one-component room temperature vulcanizable silicone rubber compositions as stated and disclosed in Kulpa, U.S. Pat. No. 3,296,161, which is incorporated into the present case by reference. Although such alkoxy, acyloxy functional silanes, need not be incorporated into the instant composition as far a increasing the resistance to moisture vapor transmission of the instant composition, nevertheless they can be so included to increase the self-bonding characteristics of the instant composition without the use of a primer.

Another ingredient that may be advantageously added to the instant composition, at a concentration of 0.1 to 20 parts by weight of the base polymer, is of a polysiloxane fluid having therein $R^{14}SiO$ units with units of the formula $R^{14}SiO_{0.5}$ and units of the formula $(R^{14})_3SiO_{0.5}$ where the polysiloxane has 0.1 to 8% by weight of silanol groups and the ratio of organosiloxy units to diorganosiloxy units varies from about 0.11:1 to 1.4:1 inclusive, and a ratio of triorganosiloxy units to diorganosiloxy units of from about 0.02:1 to 1:1 inclusive radicals, where $R^{14}$ is selected from alkyl radicals of 1 to 8 carbon atoms, phenyl, vinyl and fluoroalkyl radicals of 3 to 8 carbon atoms. The foregoing polysiloxane fluid composed of a difunctional, trifunctional and monofunctional units is disclosed in Beers, U.S. Pat. No. 3,382,205, which is incorporated into the present case by reference. As such, the preparation and the use of such component in the one-component room temperature vulcanizable silicone rubber compositions is set forth in the foregoing Beers '205 patent which is incorporated into the present case by reference, and as such it is not necessary to explain the preparation and utilization of this ingredient in a one-component system. Accordingly, this optional ingredient may advantageously be included in the instant composition to increase its adhesion to substrates without primer. It should be noted, as was the case with the Kulpa adhesion promoter, the Beers adhesion promoter did not affect the basic moisture vapor transmission properties of the uncured silicone or the cured silicone elastomer but, advantageously, may be added to the composition to increase its self-bonding characteristics to substrates in the absence of a primer. Another type of cross-linking agent that may be utilized is from 1 to 15 parts by weight of a silane of the formula,

where $R^{15}$ is an alkyl radical of 1 to 8 carbon atoms and $R^{16}$ is selected from the class consisting of alkyl radicals, phenyl radicals, alkenyl radicals and fluoroaklyl radicals of 1 to 8 carbon atoms and X is a hydrolyzable radical. This cross-linking agent can be added to improve the modulus of the composition, its self-bonding characteristics, and to increase its tensile strength without affecting in any way or manner the resistance to moisture vapor transmission of the compositions of the instant case. This cross-linking agent is more fully described in Beers, U.S. Pat. No. 3,438,930 which is incoroporated into the present case by reference. The preparation and use of such silanes in one-component room temperature vulcanizable silicone rubber compositions does not have to be explained since the foregoing Beers '930 patent is incorporated into the present case by reference.

There may also be added any of a variety of well known additives to the instant composition to produce a one-component room temperature vulcanizable silicone rubber composition which has outstanding resistance to moisture vapor transmission and in addition has additional characteristics and properties as the result of the optional ingredients inserted into the composition so that the composition may meet certain requirements that may be necessary for a low moisture vapor transmission rate one-component room temperature vulcanizable silicone rubber composition that may be desired in a particular case.

All of these optional additives are added to the base composition in the same way that the other ingredients are mixed into the composition, that is basically the mixing takes place of the one-component system in a substantially anhydrous state by the manufacturer, and the mixture is then packaged and sealed from atmospheric moisture in substantially an anhydrous state. When it is desired to cure the composition, the composition is simply applied to whatever substrate is specified for particular application and allowed to cure in the presence of atmospheric moisture. In the foregoing examples, the moisture vapor transmission rate was determined for test materials utilizing ASTM test method E-96-66 Condition E. This method comprises taking a sample, placing it on the top of a petri dish so as to blanket the dish in which dish there is maintained a dessicant so that there is 0% relative humidity below the sample in the atmosphere of the petri dish. This sample over the petri dish is then inserted into another covered dish which is sealed to atmospheric moisture and in which there is maintained a potassium salt and water solution such that inside in the second dish the atmosphere is 90% relative humidity. The sample on the Petri dish within the sealed outer container is then placed in an oven which is maintained at 100° F and a run is made for a two-week period. Every 24 hours the sample is taken and examined for moisture pick-up and the average reading of moisture pick-up of the sample for a 24 hour period in the second week of the two-week testing period is then taken as the moisture vapor transmission rate of the sample. It is not felt necessary to go further into a description of the test method since such is fully set forth in the publication of the ASTM Test Method E-96-66 Condition E, as specified above.

The following examples are given for the purpose of illustrating the scope of the instant invention and are not given for any purpose of defining the scope or the limits of the instant specification and claims.

EXAMPLE 1

There was prepared a base composition comprised of 250 parts of trimethylsiloxy silanol-terminated dimethylpolysiloxane polymer having 15,000 centipoise at 25° C and to which was mixed 30 parts by weight of octamethylcyclictetrasiloxane treated fumed silica. Into this composition there was also mixed 200 parts by weight of dry ground mica (3000 mesh size) and 96 parts of the resulting composition there was mixed into it as a catalyst cross-linking ingredient 4 parts by weight of a composition comprising 99.4% by weight methyltriacetoxysilane, 0.6% by weight dibutyl tin dilaurate. After a drying cycle of 1 hour, before the mixing of the catalyst with the other ingredients, sample sheets were prepared from the composition which sample sheets were allowed to cure in the presence of atmospheric moisture for 4 days at 25° C. The resulting cured sheets had the following physical properties:

| | |
|---|---|
| Tensile (psi) | 325 |
| Elongation (%) | 50 |
| Shore A | 60 |
| Tear (Die B) lb./in. | 30 |

Samples were also taken for the moisture vapor transmission rate test discussed above and these samples shall be known as Samples A.

EXAMPLE 2

There was prepared a composition comprising 900 parts of a silanol-terminated dimethylpolysiloxane polymer having 600 centipoise viscosity at 25° C. Into this polymer there was mixed 100 parts by weight of a silanol oil composed of trimethylsiloxy monofunctional units, dimethylsiloxy difunctional units and trifunctional units which oil had a viscosity of 45cps and a silanol content of 0.5%. To these ingredients there was added 100 parts by weight of fumed silica treated with octamethyltetrasiloxane and 1000 parts of a 3000 mesh mica. To 96% by weight of the above composition there was added 4% by weight of the same catalyst system and a cross-linking agent system as utilized in Example 1. The resulting composition was prepared in a Ross change can mixer with a 1 hour, 105° C drying cycle. The resulting composition, after the mixture was prepared, was then taken and sample sheets, hereafter referred to as Sample B, were prepared and allowed to cure for a period of time of 4 days at 25° C. These samples of silicone elastomer, known as Sample B, were then measured in ASTM press cured sheets and for their moisture vapor transmission rate properties as will be set forth hereinbelow. The physical properties of the ASTM press cured sheets after 4 days were as follows:

| | |
|---|---|
| Tensile, psi | 550 |
| Elongation, % | 63 |
| Shore A | 60 |
| Tear, die B, lbs./in. | 27 |

Afterwards samples of Sample A and Sample B were then taken and the moisture vapor transmission properties were tested in accordance with the above described ASTM Test Method E-96-66 Condition E and compared with a sample of a control room temperature vulcanizable composition containing no mica or talc in it (just ordinary reinforcing fillers, specifically fume silica) and there was also tested a typical polysulfide two-part sealant. The results of such tests in moisture vapor transmission rate are set forth hereinbelow:

| | MVTR gms/M$^2$ in 24 hrs. | Thickness mls. |
|---|---|---|
| RTV Control | 44.8 | 74 |
| Sample A | 18.0 | 70 |
| Sample B | 14.6 | 74 |
| Polysulfide | 1 – 14.8 | 75 |
| | 2 – 15.0 | 74 |

The above results clearly indicate that Samples A and B containing the mica filler were considerably improved in moisture vapor transmission rate to the control RTV having no mica and had comparable moisture vapor transmission rates to polysulfides. It should be noted further that the moisture vapor transmission rate of Samples A and B could be decreased even further by the addition of additional mica filler in the compositions.

EXAMPLE 3

There was mixed 770 parts of a silanol end-stopped dimethylpolysiloxane having a viscosity of 600 cs. with 70 parts by weight of cyclicsiloxane treated fumed silica, 105 parts by weight of a silanol oil composed of trimethylsiloxy monofunctional units, dimethylsiloxy difunctional units and methylsiloxy trifunctional units which oil has a viscosity of 45 cps at 25° C and a silanol content of 0.5% by weight and into which there was mixed 700 parts by weight of 160 mesh mica. To 96 parts of this mixture there was added 4 parts by weight of the catalyst mixture of Example 1 having therein methyltriacetoxysilane and dibutyl tin dilaurate. After a drying cycle of 1 hour after the mixing of the ingredients with the exception of the catalyst, the catalyst was then mixed and sample sheets were prepared and cured in presence of atmospheric moisture for 4 days at 25° C.

The resulting cured sheets had the following physical properties:

| | |
|---|---|
| Tensile, psi | 660 |
| Elongation, % | 50 |
| Shore A Hardness | 71 |

In the moisture vapor transmission rate test this sample had a value of 7.42 grams per meter square in a sample 71 mils thick.

I claim:

1. A low vapor transmission rate room temperature vulcanizable silicone rubber composition comprising (a) 100 parts by weight of a silanol-terminated diorganopolysiloxane having a viscosity varying from 100 to 500,000 centipoise at 25° C where the organo groups are selected from the class consisting of monovalent hydrocarbon radicals and halogenated monovalent hydrocarbon radicals; (b) from 75 to 150 parts by weight of vapor barrier filler which is mica; (c) from 1 to 15 parts by weight of a silane and siloxane having functionality selected from the class consisting of alkoxy functionality, acyloxy functionality, amine functionality, amide functionality, ketoximino functionality, and tert-alkoxy functional silanes and (d) from 0.01 to 5 parts by weight of a catalyst.

2. The composition of claim 1 wherein said silanol-terminated diorganopolysiloxane has the formula,

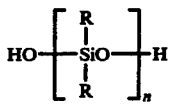

wherein R is selected from the class consisting of alkyl radicals of 1 to 8 carbon atoms, phenyl radicals, vinyl radicals and fluoroalkyl radicals and n varies from 150 to 1500.

3. The composition of claim 1 wherein said vapor barrier filler is 100% mica filler.

4. The composition of claim 1 wherein said vapor barrier filler has a particle size varying from 50 to 4000 mesh.

5. The composition of claim 1 wherein there is additionally present from 5 to 30 parts by weight of a reinforcing filler selected from the class consisting of treated fumed silica and precipitated silica.

6. The composition of claim 1 wherein in (c) said silane has the formula,

wherein $R^1$ is selected from the class consisting of alkyl radicals of 1 to 8 carbon atoms, phenyl radicals, alkenyl radicals of 2 to 8 carbon atoms and fluoroalkyl radicals of 3 to 8 carbon atoms and wherein $R^2$ is selected from the class consisting of alkyl radicals of 1 to 8 carbon atoms.

7. The composition of claim 1 wherein in (c) said silane has the formula,

wherein $R^3$ is selected from the class consisting of alkyl radicals of 1 to 8 carbon atoms, phenyl radicals, alkenyl radicals of 2 to 8 carbon atoms, and fluoroalkyl radicals of 3 to 8 carbon atoms and wherein $R^4$ is selected from alkyl radicals of 1 to 8 carbon atoms.

8. The composition of claim 1 wherein (c) said silane has the formula,

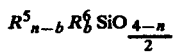

wherein $R^5$ is selected from the class consisting of hydrogen, alkyl of 1 to 8 carbon atoms and phenyl, n is at least 1 but does not exceed 4, b has a positive value agreed to of at least 3, and $R^6$ is a Si-N bonded carboxylic acid amine radical having alkyl and aryl substituents of 1 to 8 carbon atoms.

9. The composition of claim 1 wherein in (c) said silane has the formula,

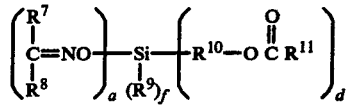

wherein $R^{11}$ is an alkyl radical of 1 to 8 carbon atoms, $R^7$ and $R^8$ may be the same or different and are alkyl radicals of 1 to 8 carbon atoms, $R^{10}$ is an alkylene radical of 2 to 8 carbon atoms, $R^9$ is an alkyl radical of 1 to 8 carbon atoms, a is a whole number varying from 1 to 3, d is a whole number varying from 1 to 3, f is a number varying from 0 to 2, and the sum of a, d and f is 4.

10. The composition of claim 1 wherein the catalyst is the metal salt of monocarboxylic or dicarboxylic acid where the metal is selected from the lead to manganese in the periodic table.

11. The composition of claim 1 wherein the catalyst is a titanium chelate.

12. The composition of claim 1 wherein there is additionally present from 0.1 to 5 parts by weight of a silane of the formula,

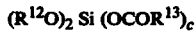

wherein $R^{12}$, $R^{13}$ are selected from alkyl and aryl radicals of 1 to 8 carbon atoms and may be the same or different.

13. The composition of claim 1 wherein there may be additionally present from 0.1 to 20 parts by weight of a polysiloxane fluid having therein ($R^{14}$SiO) units with units of the formula,

and units of the formula,

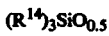

wherein said polysiloxane has 0.1 to 8 per cent by weight of silanol groups and a ratio of organosiloxy units to diorganosiloxy units varies from 0.11:1 to 1.4:1 and the ratio triorganosiloxy units to diorganosiloxy units varies from about 0.02:1 to 1:1, inclusive, where $R^{14}$ is selected from alkyl radicals of 1 to 8 carbon atoms, phenyl, vinyl and fluoroalkyl of 3 to 8 carbon atoms.

14. The composition of claim 1 wherein in (c) the silane is a silane of the formula,

wherein $R^{15}$ is an alkyl radical of 1 to 8 carbon atoms and $R^{16}$ is selected from the class consisting of alkyl radicals, phenyl radicals, alkenyl radicals and fluoroalkyl radicals of 1 to 8 carbon atoms and X is a hydrolyzable radical.

15. The composition of claim 1 wherein in (c) the silane has the formula,

wherein $R^{18}$ is selected from the class consisting of alkyl radicals, phenyl radicals and fluoroalkyl radicals of 1 to 8 carbon atoms, $R^{19}$, $R^{20}$ are selected from the class consisting of hydrogen, alkyl radicals of 1 to 8 carbon atoms and phenyl radicals, t is a whole number equal to 1 or 2 and z is 4.

16. A process for forming a low vapor transmission rate room temperature vulcanizable silicone rubber composition comprising (1) mixing (a) 100 parts by weight of a silanol-terminated diorganopolysiloxane having a viscosity varying from 100 to 500,000 centipoise at 25° C where the organo groups are selected from the class consisting of monovalent hydrocarbon radicals and halogenated monovalent hydrocarbon radicals; (b) from 75 to 150 parts by weight of a vapor barrier filler which is mica; (c) from 1 to 15 parts by weight of a silane or siloxane having functionality selected from the class consisting of alkoxy functionality, acyloxy functionality, amine functionality, amide functionality, tert-alkoxy functionality and ketoximino functionality, and (d) from 0.01 to 5 parts by weight of a catalyst, and (2) allowing the composition to cure in the presence of atmospheric moisture.

* * * * *